Oct. 26, 1965  W. G. E. WOOD ETAL  3,213,530
METHOD OF CONSTRUCTING A NUCLEAR REACTOR
CORE FROM GRAPHITE BLOCKS
Filed Nov. 28, 1960  3 Sheets-Sheet 1

United States Patent Office 3,213,530
Patented Oct. 26, 1965

3,213,530
METHOD OF CONSTRUCTING A NUCLEAR REACTOR CORE FROM GRAPHITE BLOCKS
William George Edgar Wood, Stretford, Manchester, and Peter Barrington Thomas, Eaglescliffe, near Stockton, England, assignors to A.E.I.-John Thompson Nuclear Energy Company Limited, London, England, a British company
Filed Nov. 28, 1960, Ser. No. 72,209
Claims priority, application Great Britain, Oct. 9, 1957, 31,575/57
2 Claims. (Cl. 29—428)

This application is a continuation-in-part of U.S. application Serial No. 765,907, now abandoned, filed October 7, 1958.

This invention relates to nuclear reactors and more particularly to nuclear reactors of the kind having a graphite core and which is gas-cooled. In such reactors the core is usually constructed of blocks of graphite which are arranged in vertical stacks and horizontal layers, and the blocks are drilled to provide coolant passages and passages for fuel elements and control rods. Graphite in undergoing neutron bombardment in the core exhibits a characteristic known as Wigner growth which causes an increase in dimension of the graphite. The amount of growth in any individual graphite block depends upon the neutron flux, the temperature and the direction of the grain in the graphite block in question, and the growth consequently varies throughout the pile. This Wigner growth results in an overall increase in the graphite volume during the life of the reactor and to compensate for this growth gaps known as Wigner gaps are left between the blocks and the core construction. As above mentioned the Wigner growth depends upon the direction of the grain, it is least along the direction of the grain and greatest in a direction perpendicular to the grain, and in compensating arrangements as employed hitherto the graphite blocks have been arranged with the grain vertical so that the maximum growth is horizontal. The blocks which are spaced apart horizontally have been located by slabs having a small horizontal growth interposed in the stacks of blocks so as to abut against each other.

Such arrangements provide a partial compensation but not a complete compensation, and since, as above explained, the growth varies with temperature and neutron flux it will be a maximum towards the lower part of the core, and it has been found that this causes a tendency for a radial bulge to occur around the lower part of the core. This has the disadvantage that fuel channels and control channels are liable to get out of alignment, particularly around the outer part of the core, and this may interfere with their operation.

According to the present invention the method of constructing a gas-cooled nuclear reactor with graphite core comprises arranging a plurality of graphite blocks in vertical stacks and horizontal layers forming a central compensating zone, in which compensation is made for Wigner growth, and an uncompensated zone extending annularly around the compensated zone, at least in the upper part of the reactor and so arranging the uncompensated zone that the overall increase in the horizontal dimension due to Wigner growth increases substantially progressively in successive lower layers of the graphite blocks.

With such an arrangement the growth of the core increases progressively so that distortion of fuel channels and control rod channels is minimized.

Preferably the horizontal dimension of the uncompensated zone is arranged to be a maximum at the top of the core and to reduce progressively, or in progressive steps, to a position about midway down the reactor where it ceases.

The compensated zone may be conveniently sub-divided into an upper central zone, having a relatively small compensating action and a lower zone extending substantially toward the outer surface of the core and having an appreciably greater compensating action.

In order that the invention may be more readily understood reference will now be made to the accompanying drawings, in which.

Figures 1, 2:
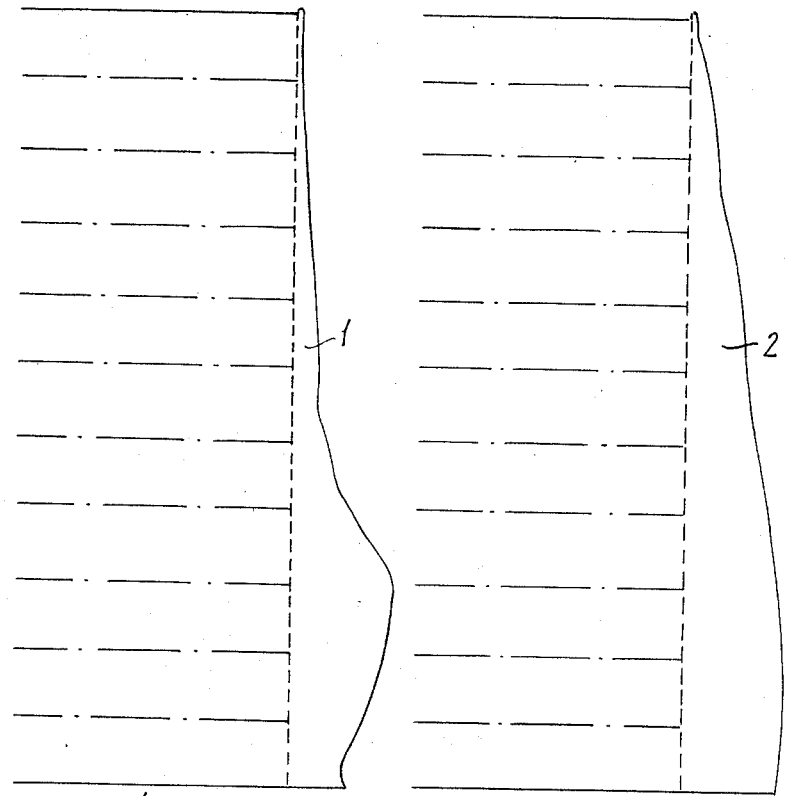
FIG. 1 is a diagram showing the estimated contour of an outer fuel channel after approximately twenty years of reactor life in a reactor core with uniform compensation for Wigner growth.
FIG. 2 is a diagram showing the estimated contour of a similar channel under similar conditions in a reactor core arrangement according to the present invention.

In FIG. 1 the line 1 represents the estimated contour of an outer fuel or control rod channel in the core of a reactor which has been active for about twenty years and is near the end of its life. The core of this reactor is constructed of graphite blocks placed one on top of the other and separated horizontally by Wigner gaps of such a size that after this length of time only those gaps which are in the area of maximum Wigner growth will have closed.

The resultant contour would cause difficulty in the movement of fuel elements or control rods within the channels. In addition due to the large Wigner gaps necessary for this construction the voidage in the core, both initially and for a number of years would be appreciably large.

Figure 3:
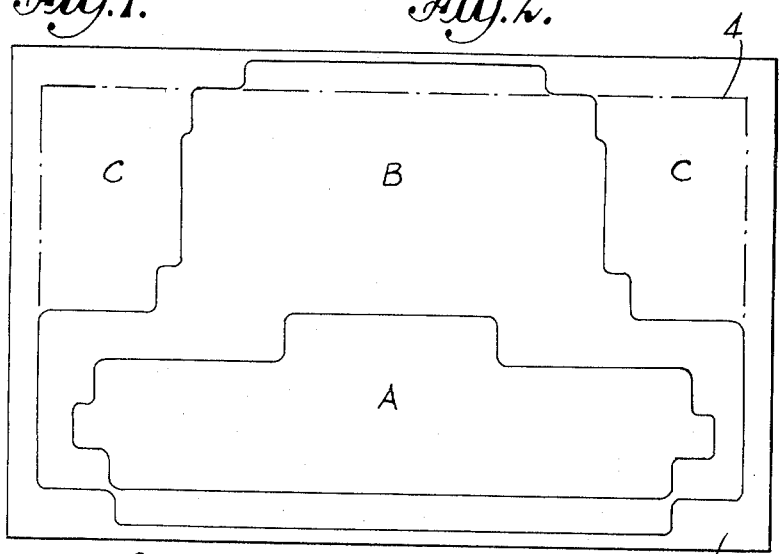
FIG. 3 is a cross sectional diagram of a reactor core constructed in accordance with the present invention showing how the zones are distributed throughout the core.

In FIG. 2 the line 2 represents the corresponding contour of an outer channel in the core of a reactor which is near the end of its life and which has been constructed in the manner shown in FIG. 3.

In FIG. 3 which is a cross-section of a reactor core, the core 3 is made up from a plurality of graphite blocks arranged with their axes vertical and separated horizontally by Wigner gaps. The chain dotted line 4 indicates the outline of the moderator. The core which includes the moderator and the reflector is divided into three zones as shown. In zone A, which is the zone in which the highest neutron flux and lowest temperature are attained, the Wigner gaps between the blocks are relatively large and there is a large amount of compensation. In zone B where the neutron flux is lower and temperature higher than in zone A, the Wigner gaps between the blocks are relatively smaller so that there is a lesser amount of compensation. In the zone C where the neutron flux is lowest and temperature highest there are no Wigner gaps between the blocks and hence there is only very small or negligible compensation.

During the life of the reactor the neutron flux will cause the growth of the graphite blocks and will cause some but not all of the Wigner gaps to close. The zones are so arranged that the changes in contour of any channel is kept to a minimum so as to retain the ease of working in the channels without the necessity of making the channels of large diameter.

The general result obtained by the arrangement of FIG. 3 is that the periphery of the core grows so that it ultimately assumes the contour shown in FIG. 2, in which there is a minium of distortion of the core channels as compared with previous arrangements in which the core has grown unevenly in the manner shown in FIG. 1.

Figure 4:
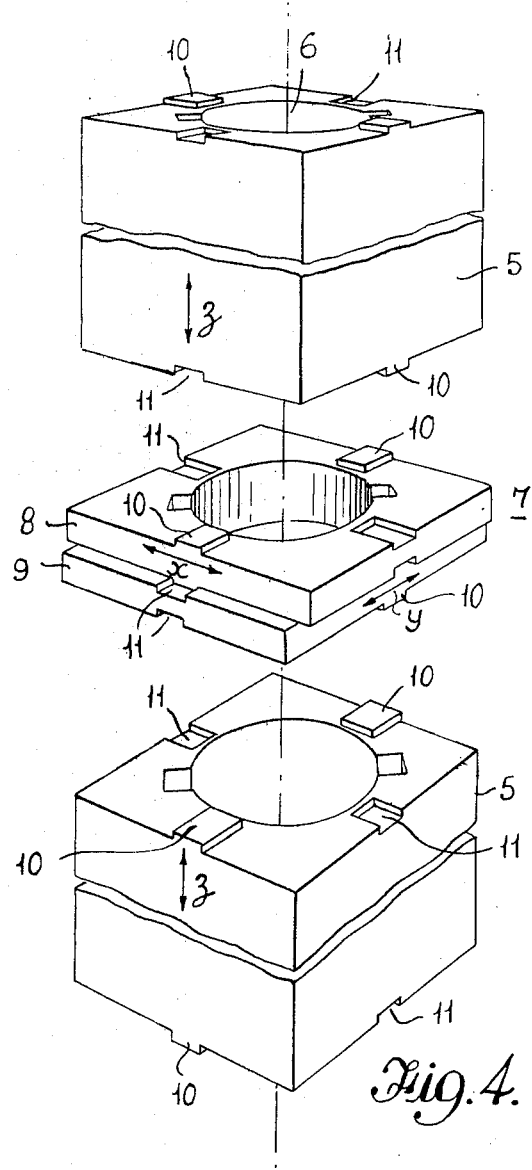
FIG. 4 is an exploded view showing the arrangement of the graphite blocks in a compensated zone.

FIG. 4 shows the arrangement of the graphite blocks in a compensated zone. The graphite blocks 5 are each formed with a vertical fuel channel 6 and are stacked one over the other with an intervening spacer slab 7. The direction of the grain in the graphite is indicated by the arrows. For purposes of explanation the $x$, $y$ and $z$ coordinate symbols have been adopted. It will be observed that in the graphite blocks 5 it is vertical, i.e., in the $z$ direction, so that these will tend to grow horizontally in both directions. The spacer slab 7, on the other hand, consists actually of two slabs one over the other, which may be integral or separate members as convenient. In both these slabs the grain is horizontal, but, as will be seen from the arrows, the two grains are perpendicular to each other, though both in horizontal planes. Thus the upper slab or half-slab 8 will have very little growth horizontally in the $x$ direction, and therefore negligible clearance can be provided, so that it will serve to hold the blocks in position along the horizontal $x$ axis. Similarly, the lower slab 9 will have negligible expansion along the horizontal $y$ axis and hence negligible clearance need be provided in this direction. In this way it will be appreciated that the core is held rigid in the horizontal plane. In accordance with customary practice the upper and lower faces of the blocks and slabs are formed with ribs 10 and grooves 11, which interfit to assist in holding the assembly in position.

Figure 5:
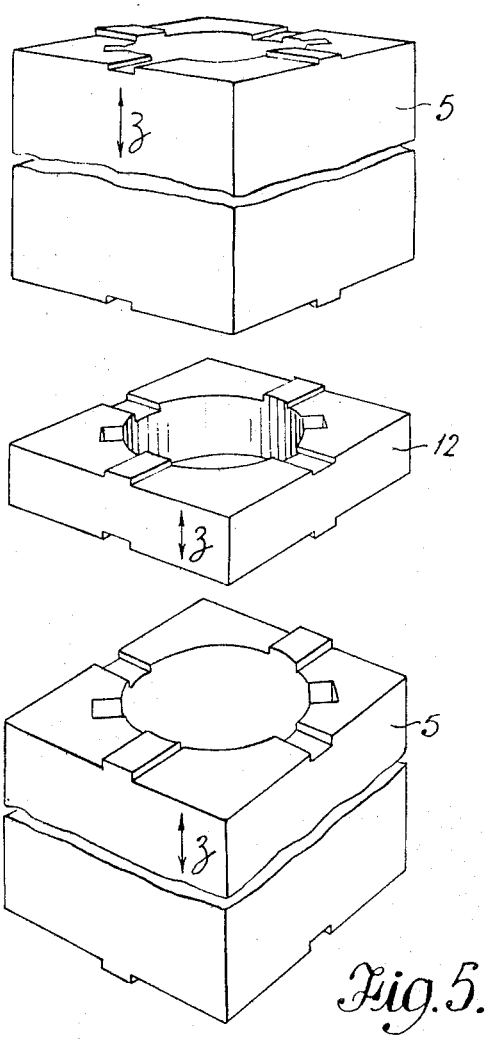
FIG. 5 is a similar view showing the arrangement of the graphite blocks in an uncompensated zone.

FIG. 5 shows the arrangement of the blocks and slabs in an uncompensated zone. In this zone the blocks 5 are the same as in the compensated zone shown in FIG. 4, but the separating slab 7 is replaced by a slab 12, in which the grain is vertical. It follows, therefore, that the slab will have the same growth in the horizontal plane as will the blocks 5, and hence the whole assembly in this zone will grow horizontally.

As an example of a practical embodiment in a core of 22 feet radius and 30 feet height and graphite blocks 8 inches square the Wigner growth in zone A could be 0.25 inch, in zone B 0.063 inch and zero in zone C.

What we claim is:

1. A method of constructing a gas cooled nuclear reactor core comprising erecting a plurality of vertical stacks of graphite blocks with the blocks arranged in horizontal layers, erecting the lower layers of at least the central stacks with horizontal spacing between adjacent blocks sufficient to provide substantially full Wigner growth compensation, erecting the upper layers of the peripheral stacks with the blocks in engagement horizontally without spacing for Wigner growth and erecting the upper layers of the inner stacks with gaps to provide for partial compensation, and proportioning the gapped zones such that a generally proportional increase in the horizontal dimensions of the core extending from the upper level thereof to the lower level thereof will result during operation of the reactor and so as substantially to eliminate non-linear distortions in at least the outer portions of said core without including excessive voidages in said core.

2. A method of reducing voidage in a nuclear reactor core having a plurality of graphite blocks arranged in vertical stacks and horizontal layers, comprising spacing adjacent blocks in a zone formed by the lower layers of at least the central stacks in the core horizontally from one another at such a distance as to provide for substantially full Wigner growth compensation, engaging adjacent blocks in a zone formed by the upper layers of the peripheral stacks in the core with one another horizontally so as to provide for no Wigner growth compensation, spacing adjacent blocks in a zone formed by the remaining blocks in the core horizontally from one another at such a distance as to provide for partial Wigner growth compensation, and proportioning the respective zones relative to one another with dimensions such that a generally proportional increase in the horizontal dimensions of the core extending from the upper level thereof to the lower level thereof will result during operation of the reactor and so as substantially to eliminate non-linear horizontal distortions in at least the outer portions of said core without including excessive voidages in said core.

References Cited by the Examiner

UNITED STATES PATENTS 2,852,457   9/58   Long et al. _____ 176—84

FOREIGN PATENTS 553,217   12/56   Belgium.
553,218   12/56   Belgium.

CARL D. QUARFORTH, *Primary Examiner.*

LEON D. ROSDOL, REUBEN EPSTEIN, *Examiners.*